US012717337B1

(12) United States Patent
Callegaro et al.

(10) Patent No.: US 12,717,337 B1
(45) Date of Patent: Aug. 25, 2026

(54) ENHANCED SCENARIO DETERMINATION SYSTEM

(71) Applicant: Zoox, Inc., Foster City, CA (US)

(72) Inventors: Davide Callegaro, Oakland, CA (US); Alec Jacob Farid, Commack, NY (US)

(73) Assignee: Zoox, Inc., Foster City, CA (US)

( * ) Notice: Subject to any disclaimer, the term of this patent is extended or adjusted under 35 U.S.C. 154(b) by 107 days.

(21) Appl. No.: 18/676,753

(22) Filed: May 29, 2024

(51) Int. Cl.
*G05D 1/229* (2024.01)
*G05D 101/15* (2024.01)
*G07C 5/02* (2006.01)

(52) U.S. Cl.
CPC ......... *G05D 1/229* (2024.01); *G05D 2101/15* (2024.01); *G07C 5/02* (2013.01)

(58) Field of Classification Search
None
See application file for complete search history.

(56) References Cited

U.S. PATENT DOCUMENTS 12,027,052 B2 * 7/2024 Pueschl ................ G08G 1/0133
2019/0304156 A1 10/2019 Amer et al.
2021/0097148 A1 * 4/2021 Bagschik ................ G06F 30/15
2021/0341921 A1 * 11/2021 Davis .................... G05D 1/0212
2021/0403036 A1 * 12/2021 Danna ................ G01C 21/3407
2021/0406262 A1 * 12/2021 Unnikrishnan ....... G06F 16/248
2022/0156605 A1 * 5/2022 Choe .................. B60W 60/0011
2023/0359780 A1 * 11/2023 Bouillon ................ G06N 20/00
2024/0239359 A1 7/2024 Frtunikj et al.
2024/0359705 A1 10/2024 Zhang et al.
2024/0416962 A1 12/2024 Terechko et al.
2025/0124788 A1 * 4/2025 Liu ...................... G08G 1/0133
2025/0153709 A1 * 5/2025 Wu ......................... G06F 30/00
2025/0191378 A1 * 6/2025 Enderich ................ G06V 20/56
2025/0200245 A1 * 6/2025 Cao ......................... G06F 30/20

FOREIGN PATENT DOCUMENTS

EP 3324332 A1 5/2018
EP 3495223 A1 6/2019

OTHER PUBLICATIONS

Niraj, et al., "Pedestrian Trajectory Prediction Using RNN Encoder-Decoder with Spatio-Temporal Attentions", 2019 IEEE 5th International Conference on Mechatronics System and Robots, 2019, 5 Pages.
Notice of Allowance for related U.S. Appl. No. 18/385,736 dated Dec. 31, 2025 (16 pages).

* cited by examiner

*Primary Examiner* — Davin Seol
(74) *Attorney, Agent, or Firm* — Lee & Hayes, P.C.

(57) ABSTRACT

Techniques for improving scenario determinations for generate testing scenarios for vehicle control system testing are disclosed. A model generates scenario embeddings based on a natural language scenario description. Similar scenarios are identified and/or generated based on similarities between the embeddings for such scenarios and the embeddings determined for the scenario description. The similar scenarios are evaluated for similarity quality and the results of this evaluation are used to adjust the embeddings, embedding determination process, and/or the similarity determination process. This process may be iteratively performed until the system consistently generates and/or identifies sufficiently similar scenarios.

20 Claims, 5 Drawing Sheets

ENHANCED SCENARIO DETERMINATION SYSTEM

BACKGROUND

Various types of data representations of real-world environments, situations, and objects configured therein ("scenarios") can be used to train and test a variety of systems, such as autonomous vehicle control systems. To ensure such systems are trained and tested thoroughly, the system may be configured to process particular types of scenarios that may not be common in a real-world environment. For example, system operators will typically want to thoroughly test a control system as it operates in a dangerous scenario even if the probability of that scenario arising is low. Because particular types of scenarios may rarely occur, it may be difficult for system operators to identify examples of such scenarios from data collected during real-world operations and/or to generate (e.g., synthetically) sufficient examples of such scenarios.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
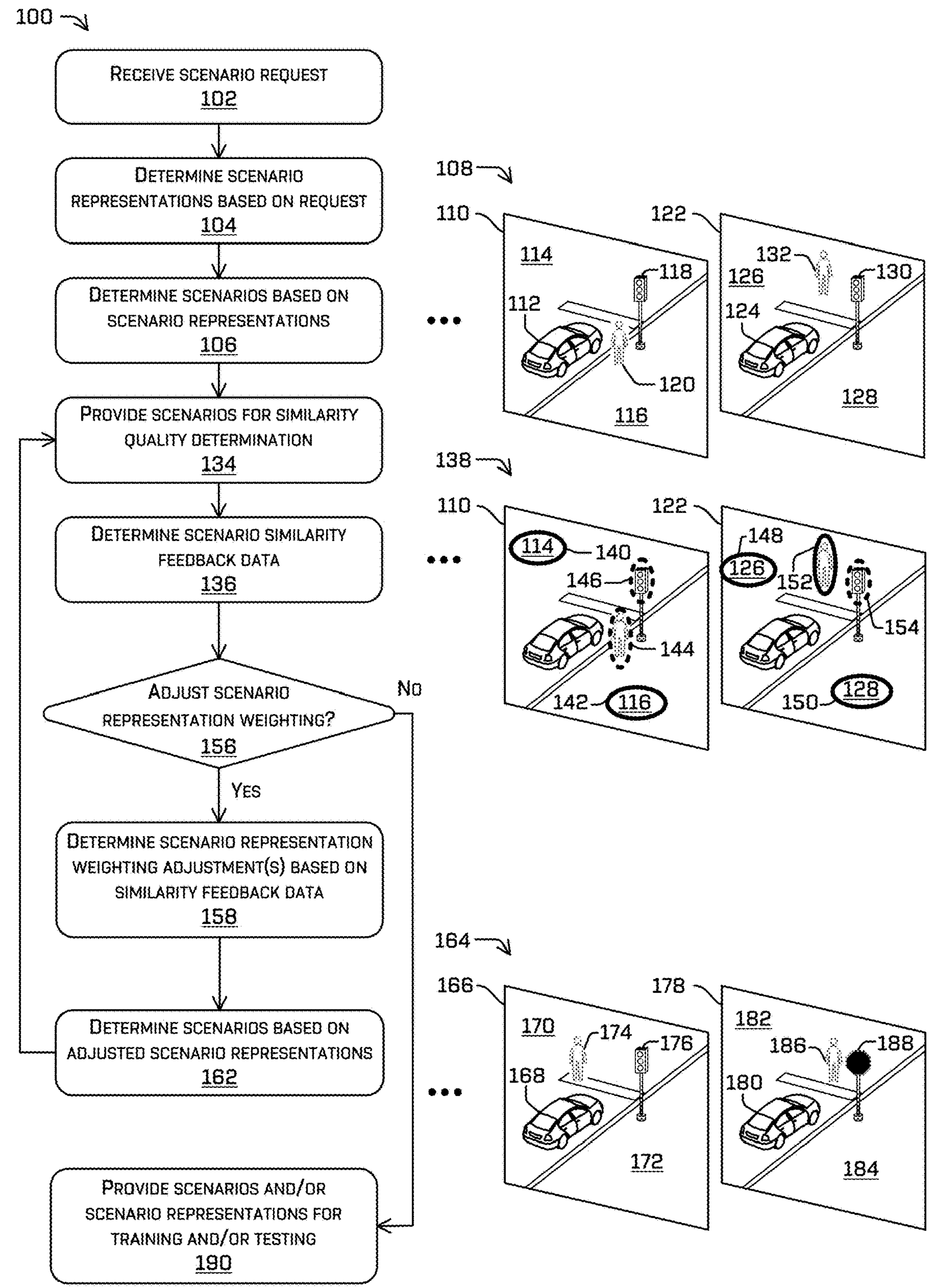
FIG. 1 is a pictorial flow diagram of an example process for enhancing a system to determine similar scenarios, in accordance with examples of the disclosure.

Techniques for enhancing the determination of similar scenarios that may be used to test and/or train vehicle control systems and components are discussed herein. A vehicle control system or component may be executed by or on behalf of a vehicle computing system to control a vehicle operating within an environment. In order to safely operate the vehicle, the vehicle control system may be thoroughly tested, including by testing how the system performs in various scenarios. In order to perform such testing, the vehicle control system may be executed using multiple scenarios of various particular types. For example, scenarios involving potentially dangerous situations (e.g., potential collision scenarios, proximate pedestrian scenarios, etc.) may be used for testing to ensure that the vehicle control system handles such situations safely. In at least some examples, before placing the vehicle in such environments, any such scenario may be tested in simulation or otherwise.

A testing system may obtain scenarios for use in such testing from data captured during operation of vehicles in a real-world environment (e.g., data collected by sensors configured on vehicles operating in a real-world environment and/or data generated using such sensor data). Alternatively or additionally, a testing system may use generated (e.g., simulated or synthetic) scenarios generated by a scenario generation system. Because many of the situations of particular interest for testing purposes relate to uncommon situations, there may be few scenarios representing such situations available in data captured during operation of vehicles in a real-world environment. Likewise, there may be few such scenarios for a scenario generation system to use as example scenarios. This may make it difficult for a testing system to obtain an adequate quantity of testing scenarios representing particular types (e.g., rare, uncommon, unexpected, etc.) of situations in which a vehicle may be operated.

To address this, an enhanced scenario determination system may be used to improve the determination of similar scenarios. A request for a particular type of scenario may be received from a requesting system (e.g., automatically or user-generated request). As used herein, a scenario may be any situation in which a vehicle may be operated and the associated environment, including one or more objects situated in the environment. A scenario may further include various characteristics and/or properties of an environment and/or the objects therein. For example, a scenario may include a vehicle traveling on a roadway at a particular location with one or more other types of vehicles on the roadway and proximate to one or more pedestrians. In further examples, scenarios may include particular types of areas, surfaces (e.g., types of roadways and/or sidewalks), intersections, structures, buildings, times, dates, days of the week, traffic control devices (e.g., signs, lights, signals, crosswalks, lane markings, etc.), vehicle conditions, conditions of other vehicles, road conditions, environmental conditions (e.g., weather, temperature, etc.), and the like.

In various examples, the system may process a scenario request to determine one or more scenario representations. A scenario representation may be or include one or more data structures representing a particular scenario and/or characteristic thereof. For example, a scenario may be represented by one or more embeddings or encodings that individually represent one or more characteristics or properties of a scenario. Alternatively or additionally, a scenario may be represented by one or more feature vectors that individually represent a feature (e.g., a characteristic or property) of a scenario. An embedding, encoding, feature vector, or other scenario representation may take the form of a vector or other set of one or more numerical values or representations of numerical data. A scenario may also, or instead, be represented by any one or more numerical or data representations of its associated features, characteristics, and/or properties.

In various examples, one or more scenario representation determination machine-learned models may be integrated into the scenario determination system enhancement process and/or its associated operations. For example, a scenario request in a natural language form may be processed as input by a large language model (LLM) executed to generate one or more scenario representations as output. These output scenario representations may be generated by such a model as scenario feature vectors, scenario embeddings, scenario encodings, and/or other data output that may then be used by scenario generation and/or determination operations as described herein to determine similar scenarios. Alternatively or additionally, a scenario request may be processed by an encoder of any other type that may include one or more machine-learned models to generate output scenario representations in the form of feature vectors, embeddings, encodings, and/or other data output.

In examples, an LLM may be trained to determine scenario representations directly. These scenario representations may then be used to determine similar scenarios as described herein. Alternatively or additionally, the output of an LLM may be language-based embeddings that may then be converted into image-based embeddings (e.g., scenario representations) using contrastive language alignment. This conversion into image-based embeddings may be performed by a machine-learned model and/or neural network trained to convert language-based embeddings to image-based embeddings (e.g., using scenario-based training data).

In examples, instead of or in addition to using an LLM, one or more scenarios and/or scenario representations may be used to determine similar scenarios. For example, the system may receive a scenario as a scenario request and may, in response, determine one or more embeddings for that scenario. The system may then use these determined embeddings to determine similar scenarios as described herein.

Using the scenario representations associated with the scenario request and, in examples, associated data of the language model, the system may determine one or more scenarios that are similar to or otherwise associated with the scenario representations. In examples, the system may query a data store of existing scenarios and/or scenario data that may have been, for example, generated based on sensor data collected by a vehicle operating in a real-world environment. For instance, various real-world scenarios may be logged by vehicles operating in the real world and stored for future use, in some examples along with associated scenario representations (e.g., embeddings, encoding, feature vectors, etc.). The system may evaluate these existing scenarios and/or associated data to determine scenarios that have scenario representations sufficiently similar to the scenario representations associated with the scenario request. In examples, the system may perform operations to numerically or mathematically compare scenario representations (e.g., feature vectors) of the stored scenarios to determine those scenario representations that are most similar to the scenario representations (e.g., feature vectors) of the scenario request.

For example, the system may determine distances or distance metrics (e.g., Euclidian distances, Manhattan distances, Minkowski distances, etc.) between a feature vector or embedding associated with the scenario request and feature vectors or embeddings associated with stored scenarios. Such distances may be represented as matrices. Based on these distances, the system may determine, as similar scenarios, those scenarios associated with feature vectors or embeddings that have a relatively low distance from a feature vector or embedding associated with the scenario request (e.g., those scenarios associated with feature vectors or embeddings that have the relatively lowest distance from the feature vector or embedding associated with the scenario request). For example, based on a number x of requested scenarios or a preconfigured scenario number parameter x, the system may determine, as similar scenarios, the x closest scenarios based on the associated distance. In another example, the system may determine a number y of closest scenarios (where y>x) and randomly select x scenarios from the y closest scenarios. In examples, the system may order the available scenarios based on their associated distance from the feature vector or embedding associated with the scenario request and select similar scenarios from this ordered set. Other algorithms and/or similarity determination operations may also, or instead, be used to identify, from existing scenarios, one or more scenarios having scenario representations sufficiently similar to a scenario representations of a scenario request.

In examples, the system may also, or instead, be configured to generate scenarios based on a scenario request. For instance, the system may execute a scenario generation system using scenario representations of a scenario request as input to generate one or more scenarios similar to and/or based at least in part on the requested scenario as output. Such a scenario generation system may use one or more example real-world scenarios as further input and/or data that may be used to generate similar scenarios. Examples of scenario generation systems and techniques are provided in U.S. patent application Ser. No. 18/619,060, filed Mar. 27, 2024, entitled "Machine Learning Techniques for Encoding Driving Scenarios," the entirety of which is incorporated herein by reference for all purposes.

The resulting determined and/or generated similar scenarios may be evaluated for similarity quality. In some cases, a scenario determination system may use a similar scenario determination operation to determine scenarios that are not sufficiently similar to the scenario intended to be represented in the scenario request. As a non-limiting example, without user input, two scenarios represented by embeddings that are clustered merely based on embedding Euclidian (or weighted Euclidian) distances may yield results that diverge from a desired result. For example, a cluster of scenarios in an embedding space may be aggregated based on the presence of a vehicle of a particular color as opposed to generating clusters in which the behavioral response of the autonomous vehicle is similar. However, as will be described in detail herein, a user may specify semantically important scenarios and, based on the techniques described in detail herein, a set of scenarios may be returned which have the property requested. For instance, a user may request driving scenarios that include at least one pedestrian crossing the street at an intersection with traffic control devices. The scenario determination system may return scenarios of pedestrians on sidewalks waiting to cross the street as well as pedestrians crossing the street in a crosswalk and pedestrians crossing outside of a crosswalk near a traffic light. At least some of the returned scenarios may not be of interest to the user requesting the driving scenarios. The disclosed systems and techniques facilitate the use of similarity quality feedback data to improve and/or enhance the determination of similar scenarios.

In examples, to determine such similar quality feedback data, the scenarios determined by a scenario determination system based on a scenario request may be provided to a feedback data determination system. This feedback data determination system may determine data indicating a similarity quality of individual scenarios among the determined scenarios and/or relevance to similarity of individual features within such scenarios. In examples, the similarity quality feedback data may be automatically generated by the feedback data determination system using various techniques. Alternatively or additionally, the feedback data determination system may collect user input providing feedback regarding the scenarios. The similarity quality feedback data may be provided to the scenario determination system for implementation or refinement of weightings and/or criteria that may be applied to scenario representations (e.g., applied to the representation and/or to one or more elements of a scenario representation) associated with the scenario request and/or adjustments to the operation(s) performed to determine similar scenarios and/or scenario representations based on the scenario representations associated with the scenario request.

Using the similarity quality feedback data, the scenario determination system may adjust or modify various aspects of the scenario representations used and/or the operation(s) used to determine similar scenarios. For example, based on indications in the feedback data that particular scenarios are similar to dissimilar, for a particular scenario request, the system may increase or decrease weightings applied to the associated scenario representations (e.g., embeddings, encodings, feature vectors, etc.) determined to represent the request. Alternatively or additionally, based on indications in the feedback data that particular features of the determined scenarios were more or less relevant, for a particular scenario request, the system may increase or decrease weightings applied to the associated scenario representations (e.g., embeddings, encodings, feature vectors, etc.) determined to represent the request. Alternatively, or additionally, the system may adjust an algorithm used to determine similarity (e.g., mathematically) of scenario representations to the representations associated with the particular scenario request. Other data used to determine similarities based on scenario representation data and/or operations that process such data may also, or instead, be implemented based on the similarity quality feedback data.

In various examples, where one or more machine-learned models (e.g., LLMs, encoders, etc.) may be integrated into the scenario determination system enhancement process to perform scenario representation determinations, the model may increase or decrease associated with output scenario representations (e.g., embeddings, encodings, feature vectors, etc.).

The system may also adjust the scenario request itself based on the similarity quality feedback data. For example, the system may determine that, in order to obtain improved similar scenarios, a particular scenario request or portions thereof (e.g., words, phrases, etc.) may be adjusted before being used as input to an (e.g., LLM) scenario representation determination component. For example, the system may determine that "pedestrian crossing the street" in a scenario request is to be adjusted to "pedestrian crossing the street in a crosswalk or outside of a crosswalk" in order to generate the scenario representations needed to determine scenarios that capture both situations.

In examples, adjustments may be determined and/or performed by one or more machine-learned scenario representation adjustment models. For example, a machine-learned adjustment model may be trained to determine adjustments to scenario representation weightings, scenario requests, and/or other scenario representation operations that correspond to similarity quality feedback data. For example, a model may be trained to determine a particular feature vector value or set of values that represent a desired similarity based on the similarity quality feedback data. This model may then determine weightings to be applied to the particular feature vector value or set of values in scenario feature vectors such that that particular feature vector value or set of values may more greatly influence distance determinations. For instance, a set of feature vector values (e.g., at particular positions within a vector) may be determined to be associated with a desired similarity. The system may apply a weighting at these value positions such that the distance measurement is more heavily influenced by the feature vector values at these positions when determining similar feature vectors. The system may also, or instead, apply a criterion at these value positions to affect a distance metric determination based on the feature vector values at these positions when determining similar feature vectors.

Using the adjusted scenario representation weightings and/or operation(s), the system may again determine one or more similar scenarios as described herein based on the initial scenario request. These resulting scenarios may also be provided to the feedback data determination system and further similarity quality feedback data may be processed to further enhance the scenario determination system and its associated operations and/or data. This process may be iteratively performed until the resulting similarity quality feedback data indicates that the determined scenarios are sufficiently similar to the scenario described by the scenario request. Alternatively or additionally, other criteria may be used to determine a termination point of this iterative process for enhancing a scenario determination system and/or a number of iterations of this process. For example, a user may desire a particular number of similar scenarios. The process may terminate once the user has selected that particular number of similar scenarios.

A particular and non-limiting example will now be provided for illustrative purposes. A natural language request for scenarios may be received at a scenario determination system as "provide scenarios including a vehicle traveling on a roadway in a busy intersection with emergency vehicles passing by and pedestrians attempting to cross the street." The scenario determination system may process this natural language request using an LLM to generate feature vectors representing determined features of this request. This may be accomplished using a model trained to generate image-based feature vectors based on natural language input and/or using a conversion component configured to convert language-based feature vectors generated by an LLM to image-based feature vectors that may be used to determine similar scenarios. The scenario determination system may use these image-based feature vectors to identify, within a database of scenarios and associated feature vectors, other feature vectors that are the same or similar to those determined for the scenario request. For example, the system may determine distances between the feature vectors in the database a feature vector determined for the scenario request. The system may then determine, based on these distances, a number of closest feature vectors in the database.

The scenario determination system may also, or instead, use these feature vectors to generate one or more scenarios. For example, the scenario determination system may generate feature vectors that are similar to those determined for the scenario request (e.g., feature vectors with a low distance from those determined for the scenario request). The scenario determination system may then execute a decoder or other scenario generation component to generate scenarios using these similar feature vectors.

In this example, based on the natural language scenario request "provide scenarios including a vehicle traveling on a roadway in a busy intersection with emergency vehicles passing by and pedestrians attempting to cross the street," the system may have determined some scenarios that include pedestrians in crosswalks and some that include pedestrian on sidewalks, but none that include pedestrian in the street not on a crosswalk. The system may have also determined some scenarios that include emergency vehicles with lights (and/or sirens) active and some scenarios with emergency vehicles parked or driving without active emergency indicators.

The scenario determination system may provide the determined and/or generated similar scenarios for similarity quality evaluation. For example, the system may solicit similarity quality evaluation feedback and/or representation quality data by presenting these scenarios to the user from which the initial natural language request was received. An interface may be presented to the user with representations of the similar scenarios. This interface may include input elements that may be activated by the user to indicate various types of similarity quality input. For example, input elements may allow the user to indicate which scenarios are similar to the intended scenario and which are not. Alternatively or additionally, input elements in the interface may allow the user to select particular elements within individual scenarios that are associated with the intended scenario and which are not. The system may interpret such element selections as scenario similarity input, that is, a selection of an element as a similar element may cause the system to generate data indicating that the scenario associated with the selected element is a similar scenario.

For instance, of the scenarios provided as described above in regard to this example, the user may select input elements indicating that the scenarios that include pedestrians in crosswalks are relevant to the requested scenario and that the scenarios that include pedestrians on sidewalks are not. The user may also, or instead, select input elements indicating that the scenarios that include emergency vehicles with active lights and/or sirens are relevant to the requested scenario and that scenarios with emergency vehicles parked or driving without active emergency indicators are not.

Alternatively or additionally, the user may select input elements indicating that the features of pedestrians in crosswalks are relevant to the requested scenario and the features of pedestrians on sidewalks are not. The user may also, or instead, select input elements indicating that the features of emergency vehicles with active lights and/or sirens are relevant to the requested scenario and that features of emergency vehicles parked or driving without active emergency indicators are not.

Based on this feedback, the system may adjust various operations and/or data used to determine similar scenarios. For instance, because the user indicated that scenarios and/or features that include pedestrians in crosswalks and emergency vehicles with active lights and/or sirens are relevant to the requested scenario, the system may adjust the scenario request processing operation(s) (e.g., as performed an LLM) to weight these features higher in the output feature vectors (e.g., weight particular elements of feature vectors higher) or otherwise weight the feature vectors of those scenarios higher. Similarly, because the user indicated that scenarios and/or features that include pedestrians on sidewalks and emergency vehicles parked or driving without active emergency indicators are not relevant to the requested scenario, the system may adjust the scenario request processing operation(s) (e.g., as performed an LLM) to weight these features lower in the output feature vectors (e.g., weight particular elements of feature vectors lower) or otherwise weight the feature vectors of those scenarios lower.

The scenario determination system may then reprocess the natural language scenario request "provide scenarios including a vehicle traveling on a roadway in a busy intersection with emergency vehicles passing by and pedestrians attempting to cross the street" and provide the resulting determined scenarios for further similarity quality evaluation, using the resulting feedback to further adjust the system and/or its operations. This process may be iteratively performed until the user indicates via the feedback interface that there are less than or equal to a threshold number (including zero) of irrelevant features and/or scenarios presented in the determined similar scenarios. Alternately or additionally, this process may be iteratively performed until a desired number of scenarios have been identified (e.g., as indicated by the user). The scenario determination system may then be used to generate scenarios for testing and/or training (e.g., a model configured at) a vehicle control component or system.

The determined weightings and/or other data (e.g., scenario request adjustments) may be stored for future use. For example, the weightings and/or scenario request adjustments associated with a particular scenario request (e.g., "pedestrian crossing the road") may be stored for use with future scenario requests that may include the same or similar language.

In examples, the similar scenarios may be used to test a vehicle control component to determine its performance and/or safety limits and/or capabilities. These determined limits and/or capabilities may then be used to configure the vehicle control component with one or more a safety metric, a safety parameter, a performance metric, a performance parameter, or other parameters that may ensure that the vehicle control component operates a vehicle within its limits to ensure safe vehicle operations and maintain passenger comfort.

The systems and techniques described herein may be directed to leveraging machine-learned models, sensor data, and associated data to improve scenario determinations that may be used to test and train vehicle control systems that may control a vehicle, such as an autonomous vehicle, in an environment. More specifically, the disclosed systems and techniques may be directed to facilitating more accurate representations of particular scenarios that can be used to more thoroughly test vehicle control systems. Using this improved data, such a vehicle may generate safer and more efficient trajectories and controls for use in navigating through an environment. In particular examples, the systems and techniques described herein can utilize machine-learned models to generate scenario representations and iteratively improve such representations to more accurately determine scenarios requested by a user. The examples described herein may result in increased certainty and accuracy in vehicle control operations, thereby allowing an autonomous vehicle to more safely and comfortably traverse the environment.

For example, techniques described herein may increase the reliability of controlling a vehicle in an environment, reducing the likelihood of introducing hazardous conditions or improperly handling driving situations. That is, the techniques described herein provide a technological improvement over existing vehicle control technology. In addition to improving the accuracy and safety of vehicle control, the systems and techniques described herein can provide a smoother ride and improve safety outcomes by, for example, more accurately providing safe passage to an intended destination through an environment using vehicle control systems that have improved function due to more thorough scenario testing using the scenario determinations as described herein. Moreover, the systems and techniques may prevent unnecessary braking or hard-braking to avoid objects that could otherwise have been smoothly avoided if better vehicle control technology were in use.

The techniques discussed herein can also improve a functioning of a computing system in a number of additional ways. In some cases, scenarios may be evaluated, determined, processed, and stored using scenario representation data structures (e.g., feature vectors, embeddings, encodings, etc.) rather than full data representation of such scenarios, thereby using fewer computational resources than previous technologies. In some examples, scenarios can be generated on-demand based on such scenario representations, thereby increasing the flexibility of generating scenarios and greatly reducing the resources that would be needed to generate and store a multitude of scenarios in advance. For example, generating a specified type of scenario and multiple similar scenarios uses fewer processing and/or memory resources (relative to attempting to store and maintain scenarios in advance), which may simplify the generation of scenarios for testing and training of many systems and components that may be configured across a variety of vehicles and platforms. These and other improvements to the functioning of the computing device are discussed herein.

The systems and techniques described herein can be implemented in several ways. Example implementations are provided below with reference to the following figures. Although discussed in the context of an autonomous vehicle, the techniques described herein can be applied to a variety of systems (e.g., a sensor system or a robotic platform) and are not limited to autonomous vehicles. For example, the techniques described herein may be applied to semi-autonomous and/or manually operated vehicles. In another example, the techniques can be utilized in an aviation or nautical context, or in any system involving objects or entities for which object detection data is obtained or desired and/or in which machine-learned models are used. Further, although discussed in the context of particular types of data and detection using particular types of sensors, any suitable types of sensors and emitters are contemplated, as well as other types of sensor data (e.g., cameras, lidar, sonar, radar, audio, ultrasonic, time of flight, infrared, etc.). Furthermore, the disclosed systems and techniques may include using various types of components and various types of data and data structures, including, but not limited to, various types of image data and/or other sensor data (e.g., stereo cameras, time-of-flight data, radar data, sonar data, audio data, lidar data, and the like). For example, the techniques may be applied to any such sensor systems (e.g., scenarios may be derived from data collected using any such sensor systems). Additionally, the techniques described herein can be used with real data (e.g., captured using sensor(s)), simulated data (e.g., generated by a simulator), or any combination of the two.

Figure 4:
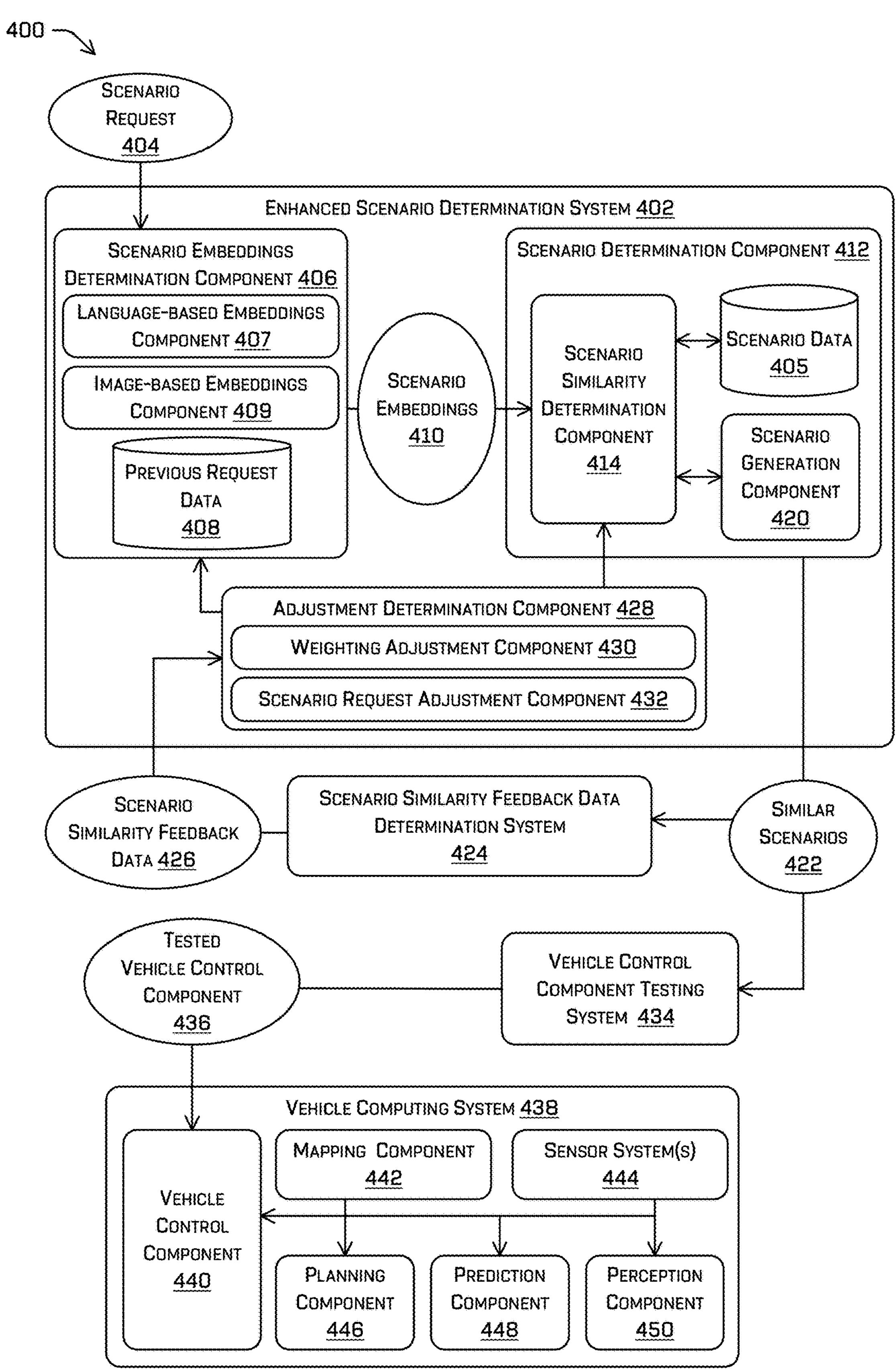
FIG. 4 is a block diagram of a system for determining similar scenarios, in accordance with examples of the disclosure.
Figure 5:
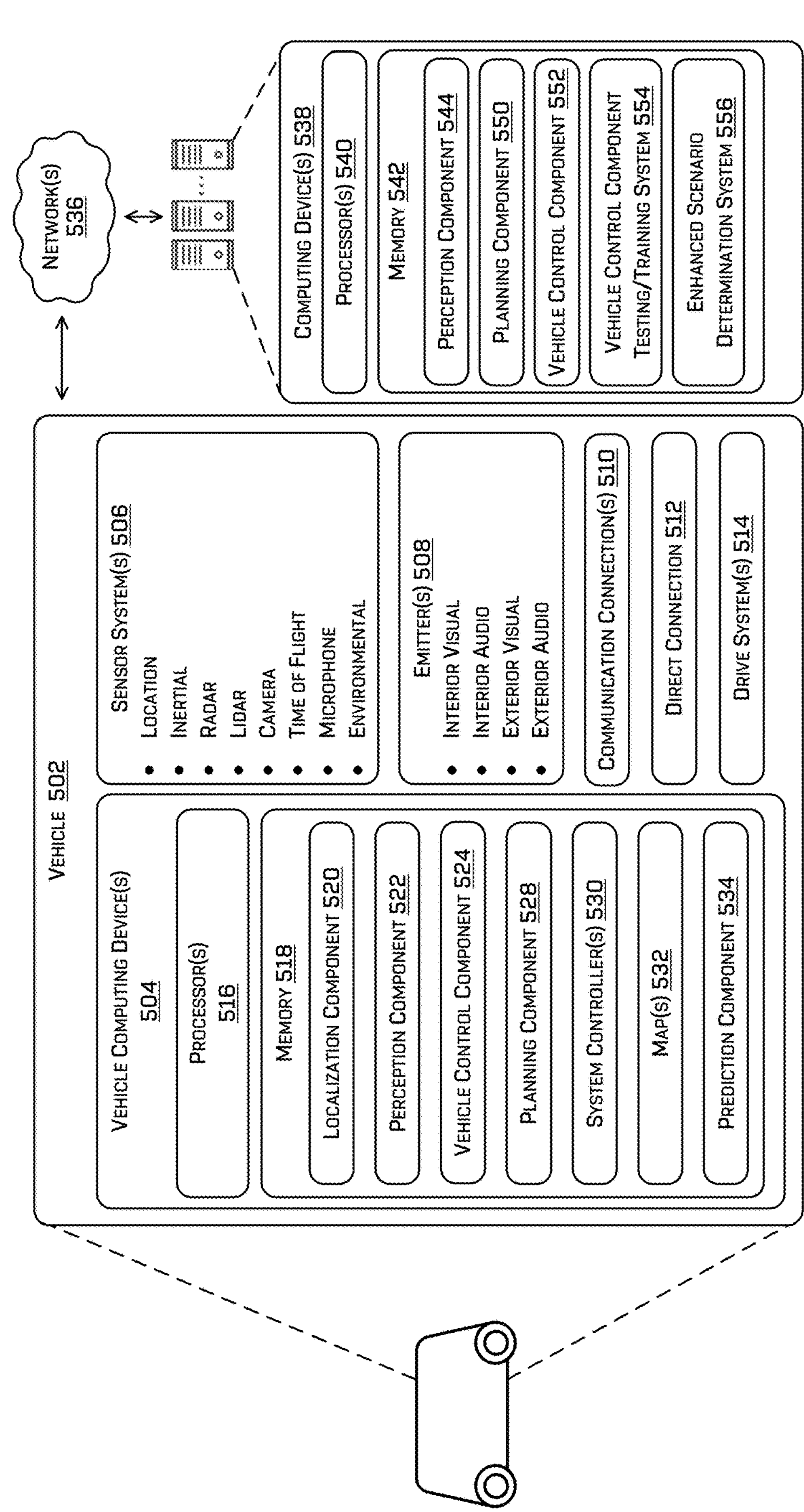
FIG. 5 is a block diagram of an example system for implementing the techniques described herein.

FIG. 1 is a pictorial flow diagram of an example process 100 for determining similar scenarios and enhancing a scenario determination system. In some examples, one or more operations of the process 100 may be implemented by a vehicle computing system and/or by an enhanced scenario determination system, such as by using one or more of the components and systems illustrated in FIGS. 4 and 5 and described below. For example, one or more components and systems can include those associated with one or more of the one or more sensor systems 506, the perception component 522, the planning component 528, the vehicle control component 524, and the system controller(s) 530. In some examples, the one or more operations of the process 100 may also, or instead, be performed by systems represented in FIG. 4 and/or one or more components associated therewith. In some examples, the one or more operations of the process 100 may also, or instead, be performed by a remote system in communication with a vehicle, such as the perception component 544, the planning component 550, the vehicle control component 552, the vehicle control component testing/training system 554, and the enhanced scenario determination system 556 of the computing device(s) 538 illustrated in FIG. 5. In still other examples, the one or more operations of the process 100 may be performed by a combination of a remote system and a vehicle computing system. However, the process 100 is not limited to being performed by such components and systems, and the components and systems of FIGS. 4 and 5 are not limited to performing the process 100.

At operation 102, a scenario request may be received at a scenario determination system. This request may take any form, including a natural language request. For example, the request received at operation 102 may be a natural language description of a situation and/or environment in which a vehicle may operate. This description may include particular types of vehicles and/or other objects (e.g., pedestrians, buildings, lights, etc.) that may be present in an environment as well as any actions or activities being performed by such vehicles and/or objects. Alternatively, the request received at operation 102 may be, or may include, one or more scenarios and/or scenario representations for which similar scenarios may be desired.

At operation 104, based on the received scenario request, the system may determine scenario representations. For example, the system may process the scenario request to determine one or more data structures representing properties and/or characteristics of the requested scenario. In some examples, the system may generate one or more feature vectors, embeddings, and/or encodings that individually represent one or more characteristics or properties of the requested scenario. In some examples, to generate these data structures, the system may execute one or more machine-learned models, such as an LLM, to process the natural language of the scenario request into embeddings or feature vectors. This LLM may be trained to determine such embeddings or feature vectors directly. Alternatively or additionally, the output of the LLM may be language-based embeddings or feature vectors may be converted into image-based embeddings or feature vectors by a machine-learned model and/or neural network using, for example, contrastive language alignment. Alternatively or additionally, a scenario request may be processed by an encoder (that may also include one or more machine-learned models) to generate output scenario representations in the form of feature vectors, embeddings, encodings, and/or other data output. In examples, where a scenario is received as a scenario request, the system may determine one or more scenario representations based on the input scenario at operation 104.

At operation 106, the system may determine one or more scenarios based on the scenario representation determined at operation 104. In examples, this may include determining scenario representations of existing scenarios that are sufficiently similar to the scenario representations determined for the scenario request at operation 104. For instance, the system may identify feature vectors or embeddings associated with existing scenarios that have a relatively low distance from the vectors or embeddings associated with the scenario request. Alternatively or additionally, this may include generating scenarios using scenario representations that are sufficiently similar to the scenario representations determined for the scenario request. For instance, the system may generate similar scenario representations (e.g., similar feature vectors or embeddings) that are a relatively low distance from scenario representations associated with the scenario request. The scenario determination system may then execute a decoder or other scenario generation component to generate scenarios using these similar scenario representations.

An example 108 illustrates two scenarios that may be determined using these operations. In this example, the system may have received a natural language scenario request such as "provide scenarios of a vehicle on a roadway near a sidewalk at an intersection with a pedestrian crossing the street." The system may determine scenario representations based on this request and use the representations to identify existing scenarios (e.g., scenarios with associated scenario representations sufficiently close in distance to the scenario representations based on this request) and/or generate similar scenarios.

Two such scenarios may be scenarios 110 and 122. In scenario 110, a vehicle 112 may be on a roadway 114 and next to a sidewalk 116. A traffic light 118 may serve as a traffic control device for vehicles on the roadway 114. A pedestrian 120 may be on the sidewalk 116. In scenario 122, a vehicle 124 may be on a roadway 126 and next to a sidewalk 128. A traffic light 130 may serve as a traffic control device for vehicles on the roadway 126. A pedestrian 132 may be in the roadway 114.

At operation 134, the scenarios determined at operation 106 may be provided (e.g., to a user or other machine) for similarity quality determinations. For example, the system may generate (or cause the generation of) an interface that may present the scenarios to a user and facilitate the collection of user input indicating the particular aspects of individual scenarios that are similar and/or relevant to the scenario request (e.g., the intent of the scenario request) and/or user input indicating the particular aspects of individual scenarios that are dissimilar and/or irrelevant to the scenario request. This interface may include input elements that may be activated by the user to indicate various types of similarity quality input. Alternatively or additionally, the system may provide the determined scenarios to an (e.g., automated) scenario similarity feedback data determination system that may be executed to determine similar, dissimilar, relevant, and/or irrelevant aspects of individual scenarios as compared to the scenario request. Such a system may include one or more machine-learned models trained to perform such evaluations as described herein. In various examples, such input may be a simple binary indication (e.g., "thumbs up"/"thumbs down") as to whether the scenario output comports with the input request. The system may also, or instead, interpret selections of individual elements of scenarios presented to the user as scenario similarity input. For instance, a selection of an element as a similar element may cause the system to generate data indicating that the scenario associated with the selected element is a similar scenario At operation 136, scenario similarity quality feedback data may be received. The system may determine such data based on detecting user activation of various input elements on the interface presented at the operation 134 or otherwise performing other processing to determine such data, such as receiving feedback data from a scenario similarity feedback data determination system.

An example 138 illustrates the scenarios 110 and 122 of the example 108. In this example, various aspects of the individual scenarios have been determined to be relevant/irrelevant and/or similar/dissimilar to the requested scenario (e.g., based on user input and/or by a scenario similarity feedback data determination system). As shown in this example, in scenario 110, indications 140 and 142 represent a determination that the roadway 114 and the sidewalk 116 are elements relevant or similar to the scenario request. Indications 144 and 146 represent a determination that the pedestrian 120 and the traffic light 118 (labeled in the example 108) are elements irrelevant or dissimilar to the scenario request. Also as shown in this example, in scenario 122, indications 148, 150, and 152 represent a determination that the roadway 126, the sidewalk 128, and the pedestrian 132 (labeled in the example 108) are elements relevant or similar to the scenario request. Indication 154 represents a determination that the traffic light 130 (labeled in the example 108) is an element that is irrelevant or dissimilar to the scenario request. The selection of these individual features may be used to determine scenario similarity. For example, the system may process the selection of the roadway 114 and/or the sidewalk 116 (e.g., indications 140 and 142, respectively) as relevant or similar features as an indication that the scenario 110 is similar or relevant. Likewise, the system may process the selection of the pedestrian 120 and/or the traffic light 118 (e.g., indications 144 and 146, respectively) as irrelevant or dissimilar features as an indication that the scenario 110 is dissimilar or irrelevant.

At operation 156, the system may determine whether to adjust scenario representation weighting(s) and/or perform other actions based on the similarity quality feedback data. In examples, the similarity quality feedback data may indicate that less than or equal to a threshold number (including zero) of scenarios provided for evaluation at operation 134 were indicated as dissimilar or irrelevant (e.g., via scenario selections and/or scenario feature selections). In such examples, no adjustments may be implemented. If no adjustments are to be implemented, the process 100 may proceed to operation 190, where the system may provide determined scenarios for testing and/or training purposes as described herein.

If, at operation 156, the system determines that adjustments are warranted based on the similarity quality feedback data, at operation 158, the system may determine the particular aspects of such adjustments. For example, the system may implement or adjust weightings applied to scenario representations and/or elements of scenario representations when performing distance determinations as described herein. At operation 158 the particular weighting changes may be determined. In examples, a model may be trained to determine such weighting adjustments based on the similarity quality feedback data. Further at operation 158, the adjustments may be implemented (e.g., stored for use in a subsequent interaction of the process 100).

At operation 162, using the adjusted scenario representation weightings, the system may determine another one or more similar scenarios based on the scenario request. This operation may include redetermining similar scenario representations based on the scenario request using the weightings determined at operation 158 to determine distances between potentially similar scenario representations and the scenario representation(s) associated with the scenario request. These scenarios may be provided for similarity quality evaluation, returning to operation 134.

An example 164 illustrates two scenarios 166 and 178 that may be determined based on distances determined using weightings that may have been determined based on the similarity quality feedback data of the example 138. In scenario 166, a vehicle 168 may be on a roadway 170 and next to a sidewalk 172. A traffic light 176 may serve as a traffic control device for vehicles on the roadway 170. A pedestrian 174 may be in the roadway 170. In scenario 178, a vehicle 180 may be on a roadway 182 and next to a sidewalk 184. A stop sign 188 may serve as a traffic control device for vehicles on the roadway 182. A pedestrian 186 may be in the roadway 182. As seen here, these scenarios may be more similar to the scenario request "provide scenarios of a vehicle on a roadway near a sidewalk at an intersection with a pedestrian crossing the street" described above in regard to the example 108. This may be due to adjustments made to weightings used to determine scenario representation distances based on the feedback provided and illustrated in the example 138. Here, both scenarios include a pedestrian actually in the street, indicated as relevant in example 138 (as opposed to the relevant indication associated with the pedestrian on the sidewalk), while the traffic control devices are more varied (stop sign and traffic light as opposed to only traffic lights) as traffic lights were indicated as irrelevant in the example 138. The sidewalks and roadways are also represented as well, as these may have been associated with the scenarios indicated relevant and/or similar in the example 138.

Figure 2:
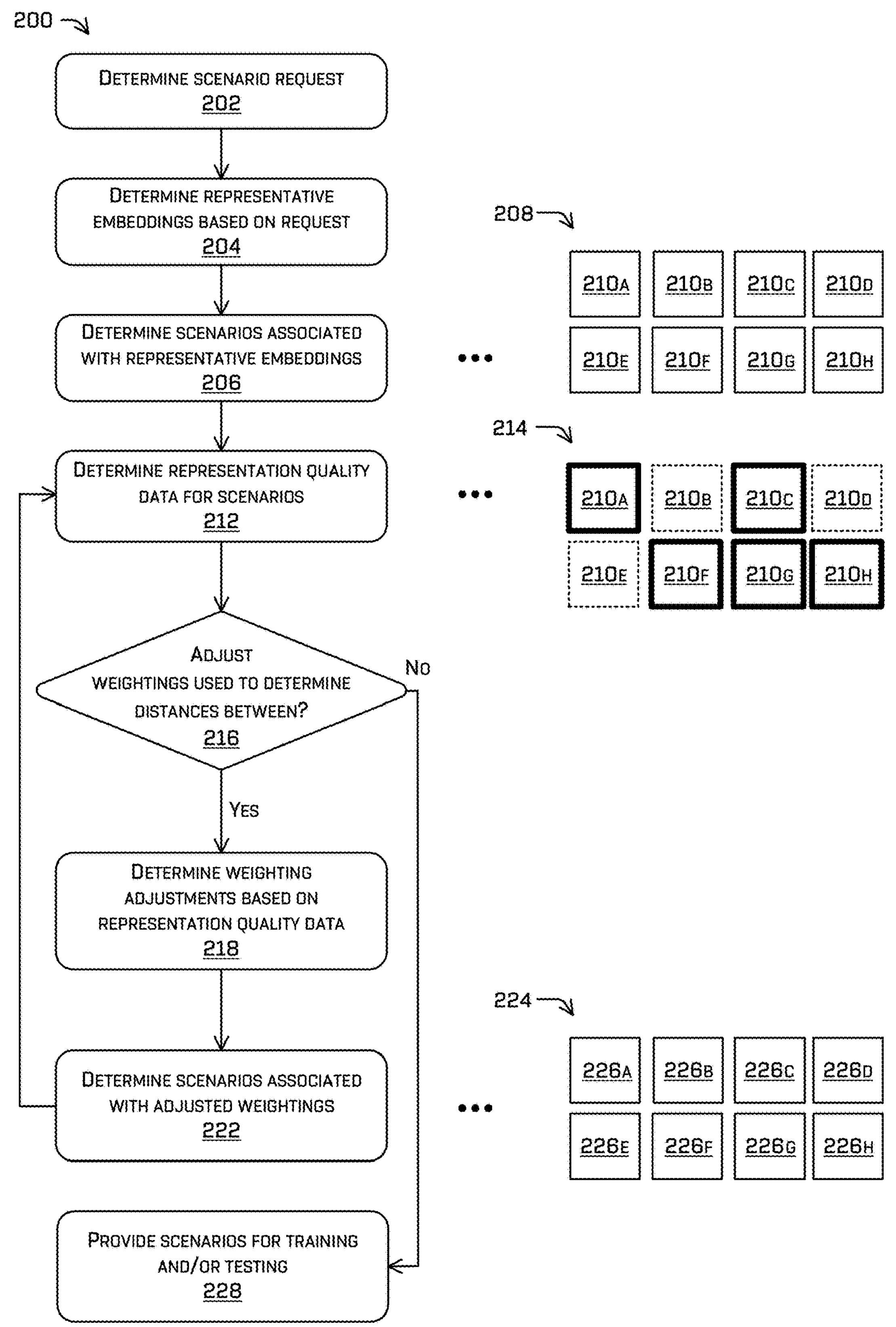
FIG. 2 is a pictorial flow diagram of another example process for enhancing a system to determine similar scenarios, in accordance with examples of the disclosure.

FIG. 2 is a pictorial flow diagram of an example process 200 for determining similar scenarios and enhancing a scenario determination system. In some examples, one or more operations of the process 200 may be implemented by a vehicle computing system and/or by an enhanced scenario determination system, such as by using one or more of the components and systems illustrated in FIGS. 4 and 5 and described below. For example, one or more components and systems can include those associated with one or more of the one or more sensor systems 506, the perception component 522, the planning component 528, the vehicle control component 524, and the system controller(s) 530. In some examples, the one or more operations of the process 200 may also, or instead, be performed by systems represented in FIG. 4 and/or one or more components associated therewith. In some examples, the one or more operations of the process 200 may also, or instead, be performed by a remote system in communication with a vehicle, such as the perception component 544, the planning component 550, the vehicle control component 552, the vehicle control component testing/training system 554, and the enhanced scenario determination system 556 of the computing device(s) 538 illustrated in FIG. 5. In still other examples, the one or more operations of the process 200 may be performed by a combination of a remote system and a vehicle computing system. However, the process 200 is not limited to being performed by such components and systems, and the components and systems of FIGS. 4 and 5 are not limited to performing the process 200.

At operation 202, a scenario request may be determined at a scenario determination system. This request may take any form, including a natural language request. For example, the request received at 202 may be a natural language description of a situation and/or environment in which a vehicle may operate. This description may include particular types of vehicles and/or other objects (e.g., pedestrians, buildings, lights, etc.) that may be present in an environment as well as any actions or activities being performed by such vehicles and/or objects. The request received at operation 202 may be, or may include, one or more scenarios and/or scenario representations for which similar scenarios may be desired. In examples, this scenario request may be generated by another system, such as a scenario request generation system that may include one or machine-learned models trained to determine specific (e.g., optimal) scenario request language, scenarios, and/or scenario representations (e.g., embeddings). The use of such models may increase the efficiency of generated scenarios for testing and training.

At operation 204, based on the scenario request, the system may determine representative embeddings. For example, the system may process the scenario request to determine one or more embedding data structures representing properties and/or characteristics of the requested scenario. In some examples, the system may also, or instead, generate one or more feature vectors and/or encodings that individually represent one or more characteristics or properties of the requested scenario. As described herein, the system may execute one or more machine-learned models to process a natural language description of a requested scenario into representative embeddings. For example, a natural language description of a scenario received at operation 202 may be used as input to an LLM that may generate language-base embeddings as output. These language-based embeddings may then be provided to a machine-learned model and/or neural network that may use one or more processes or techniques, such as contrastive language alignment, to generate image-based embeddings as output. These image-based embeddings may then be used to determine similar scenarios (e.g., embeddings associated with similar scenarios) as described herein. Alternative means may also, or instead, be used, to process a requested scenario into representative embeddings, such as an encoder.

At operation 206, the system may determine one or more scenarios based on the embeddings determined at operation 204. In examples, this may include determining embeddings associated with existing scenarios that are sufficiently similar, for example, based on distances between the embeddings associated with existing scenarios and the embeddings determined for the scenario request at operation 204. For instance, the system may identify embeddings associated with existing scenarios that have relatively lowest distances from the embeddings determined for the scenario request. Alternatively or additionally, this may include generating scenarios using embeddings that are sufficiently similar to the embeddings determined for the scenario request. For instance, the system may generate similar embeddings with values relatively close to the values in embeddings associated with the scenario request. The scenario determination system may then execute a decoder or other scenario generation component to generate scenarios using these similar embeddings.

An example 208 illustrates scenarios 210*a-h* that may be determined using these operations. In this example, the system may have received a natural language scenario request such as "provide scenarios of a vehicle near a railroad track and a train approaching." The system may determine embeddings based on this request and use the embeddings to identify existing scenarios (e.g., scenarios with associated embeddings sufficiently close in distance to the embeddings based on the request) and/or generate similar scenarios.

At operation 212, the system may determine representation quality data for the scenarios determined at the operation 206. For example, the system may generate (or cause the generation of) an interface that may present the determined similar scenarios to a user and facilitate the collection of user input indicating the similarity and/or relevancy of the individual scenarios (e.g., as a whole). This interface may include input elements that may be activated by the user to indicate various types of similarity quality input for a particular scenario. Alternatively or additionally, the system may provide the determined scenarios to an (e.g., automated) scenario similarity feedback data determination system that may be executed to determine similarity, dissimilarity, relevancy, and/or irrelevancy of individual scenarios as compared to the scenario request. Such a system may include one or more machine-learned models trained to perform such evaluations as described herein.

An example 214 illustrates the scenarios 210*a-h* of the example 208. In this example, the individual scenarios (e.g., as a whole) have been determined to be relevant/irrelevant and/or similar/dissimilar to the requested scenario (e.g., based on user input and/or by a scenario similarity feedback data determination system). As shown in this example, scenarios 210*a*, 210*c*, 210*f*, 210*g*, and 210*h* have been indicated as relevant and/or similar to the scenario request. Alternately or additionally, scenarios 210*b*, 210*d*, and 210*e* have been indicated as irrelevant and/or dissimilar to the scenario request.

At operation 216, the system may determine whether to adjust weightings used in determining distances between embeddings and/or perform other actions based on the representation quality data determined at operation 212. In examples, the representation quality data may indicate that less than or equal to a threshold number (including zero) of the scenarios evaluated at operation 212 have been determined to be dissimilar or irrelevant to the search request. Alternatively, values within the representation quality data may be compared to various thresholds to determine whether adjustments are needed. For example, there may be an adjustment threshold applied to quantities of scenarios indicated as irrelevant or insufficient. If the threshold is not met or exceeded (e.g., there is below a threshold number of scenarios indicated irrelevant or insufficient in the representation quality data), adjustments may not be implemented as described herein. Alternately or additionally, at least a threshold total number of similar scenarios may be represented by the data determined at operation 212. For example, a user may have indicated a request for a particular number of similar scenarios and the data determined at operation 212 may indicate that at least the requested number of similar scenarios have been selected. If no adjustments are to be implemented, the process 200 may proceed to operation 228, where the system may provide determined similar scenarios for testing and/or training purposes as described herein.

If, at operation 216, the system determines that weightings and/or other adjustments are warranted based on the representation quality data, at operation 218, the system may determine the particular aspects of such adjustments. For example, the system may perform adjustments as described herein to adjust weightings and/or other properties of metrics used to measure embedding distances to determine those embeddings that may be associated with the scenario request. In examples, a model may be trained to determine such adjustments based on the representation quality data. Further at operation 218, the determined adjustments may be implemented or otherwise stored for subsequent use.

At operation 222, using the adjusted embedding weightings and/or adjusted operations where applicable, the system may determine another one or more similar scenarios based on the scenario request. This operation may include redetermining relatively close embeddings based on the scenario request using the updated weightings as determined at operation 218. These subsequently determined similar scenarios may be provided for representation quality data determinations, returning to operation 212.

An example 224 illustrates updated scenarios that may be determined based on adjusted weightings and/or other adjustments that may have been determined and/or performed based on the representation quality data of the example 214. In this example, a new set of scenarios 226*a-h* may be determined as scenarios determined to be similar to the scenario request using updated weightings based on the representation quality data of operation 212.

Figure 3:
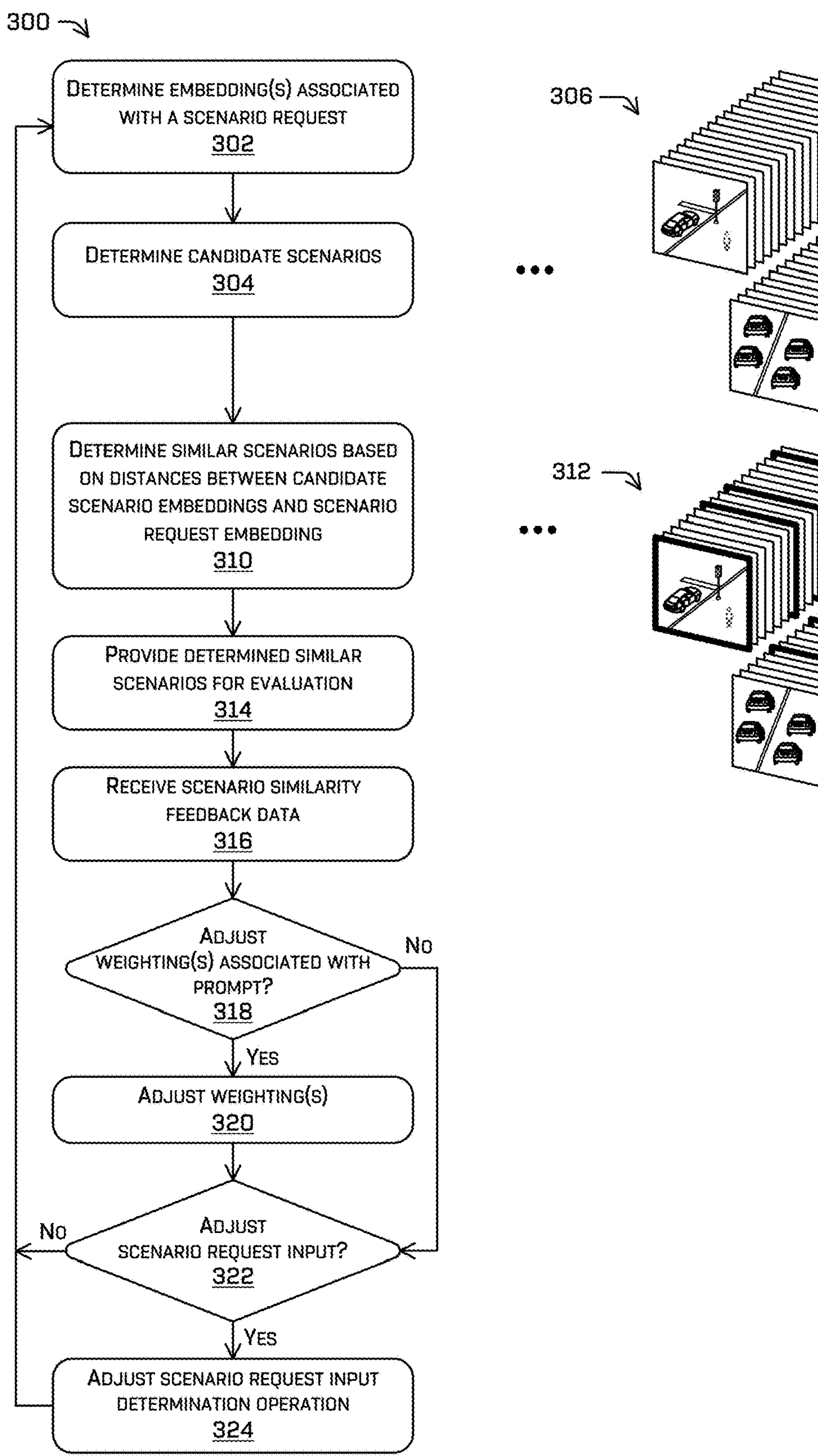
FIG. 3 is a pictorial flow diagram of an example process for adjusting various components of a system to determine similar scenarios, in accordance with examples of the disclosure.

FIG. 3 is a pictorial flow diagram of an example process 300 for adjusting scenario determination data and/or operations based on similarity quality feedback data in a scenario determination system. In some examples, one or more operations of the process 300 may be implemented by a vehicle computing system and/or by an enhanced scenario determination system, such as by using one or more of the components and systems illustrated in FIGS. 4 and 5 and described below. For example, one or more components and systems can include those associated with one or more of the one or more sensor systems 506, the perception component 522, the planning component 528, the vehicle control component 524, and the system controller(s) 530. In some examples, the one or more operations of the process 300 may also, or instead, be performed by systems represented in FIG. 4 and/or one or more components associated therewith. In some examples, the one or more operations of the process 300 may also, or instead, be performed by a remote system in communication with a vehicle, such as the perception component 544, the planning component 550, the vehicle control component 552, the vehicle control component testing/training system 554, and the enhanced scenario determination system 556 of the computing device(s) 538 illustrated in FIG. 5. In still other examples, the one or more operations of the process 300 may be performed by a combination of a remote system and a vehicle computing system. However, the process 300 is not limited to being performed by such components and systems, and the components and systems of FIGS. 4 and 5 are not limited to performing the process 300.

At operation 302, a scenario determination system may determine one or more embeddings associated with a scenario request. For example, the system may execute an LLM trained to generate scenario embeddings as output using a natural language representation of the scenario request as input. Alternately or additionally, the system may execute an LLM to generate, based on using a natural language description of a scenario request, language-based embeddings as output. The system may then provide these language-based embeddings as input to a machine-learned model and/or neural network that may be trained to generate image-based embeddings for language-based embeddings using, for example, contrastive language alignment techniques. Various other techniques may be used to determine various types of scenario representations based on the scenario request, including as described herein.

At operation 304, one or more candidate scenarios may be determined. The candidate scenarios may be a set or pool of scenarios from which scenarios similar to the scenario request may be determined. For example, the system may access a data store of scenarios determined or generated based on sensor data collected by vehicles traversing a real-world environment. This data store may also store embeddings associated with such candidate scenarios. Alternatively, the data store may store embeddings and no actual scenarios, allowing for the reconstruction of scenarios from such embeddings using a decoder as needed. In such an example, less memory resources may be required. An example 306 illustrates a set of candidate scenarios that may be determined for further scenario determination processing.

At operation 310, the system may determine scenarios that are similar to the requested scenario based on the embeddings of the candidate scenarios, the embeddings associated with the scenario request, and the distances between such embeddings. For example, the system may determine, for the individual candidate scenarios, a distance (e.g., Euclidean distance) between the individual candidate scenario embeddings and the embedding associated with the scenario request. The system may then determine a subset of the candidate scenarios that have embeddings with a relatively lowest distance from the embedding associated with the scenario request as similar scenarios. In examples, this subset may be a number of requested scenarios (e.g., user requested number of scenarios) and/or a random selection of a number of scenarios (e.g., user requested number of scenarios) from among another subset of the subset of the candidate scenarios determined to be the relatively closest scenarios to the requested scenario (e.g., based on embedding distances).

An example, 312 illustrates the set of candidate scenarios of the example 306, where those scenarios that have been determined to have embeddings that are relatively closest in distance to the requested scenario are emphasized and may be used for further similar scenario determination processing.

At operation 314, the system may provide the determined similar scenarios for similarity quality evaluation. For example, the system may present the scenarios determined at operation 310 to the user from which the initial scenario request was received. An interface may be presented to the user with representations of the similar scenarios. This interface may include input elements that may be activated by the user to indicate various types of similarity quality input, such as a similarity evaluation of the scenarios as a whole and/or particular elements within individual scenarios that are similar or dissimilar. Alternatively or additionally, the determined similar scenarios may be automatically processed by, e.g., a feedback data determination system using one or more models and/or other techniques to determine scenario similarity data. At operation 316, the system may receive the determined scenario similarity data.

At operation 318, the system may determine whether to adjust one or more weightings used to determine distances between embeddings based on the scenario similarity data. In various examples, weightings used to determine distances between candidate embeddings and an embedding associated with a scenario request may be adjusted based on scenario similarity data. For instance, the system may be configured to increase or decrease weightings applied to the particular embedding values based on the scenario similarity data.

If weighting adjustments are to be made, at operation 320 such adjustments may be implemented. The process may then proceed to operation 322. However, if no weighting adjustments are to be made as determined at operation 318, the process may proceed (e.g., directly) from operation 318 to operation 322.

At operation 322, the system may determine whether to adjust the scenario request input, for example, before using such input as input to an LLM to generate embeddings (e.g., language-based embeddings that are then processed by another model or network to generate image-based embeddings) based on the scenario similarity feedback data received at operation 316. For example, the system may determine that, in order to obtain improved similar scenarios, a particular scenario request or portions thereof (e.g., words, phrases, etc.) may be adjusted before being used as input to an LLM to determine embeddings used for determining similar scenarios. For example, the system may determine that "pedestrian crossing the street" in a scenario request is to be adjusted to "pedestrian crossing the street in a crosswalk or outside of a crosswalk" in order to generate the embeddings needed to determine scenarios that capture both situations.

If scenario request input adjustments are to be made, at operation 324 such adjustments may be implemented. The process 300 may then return to operation 302 for further similarity evaluations and scenario determinations. However, if no scenario request input adjustments are to be made as determined at operation 322, the process may proceed (e.g., directly) from operation 322 to operation 302 for further similarity evaluations and scenario determinations.

FIG. 4 illustrates a block diagram of an example scenario determination system 400 implemented by a computing system to improve the determination of scenarios, as described herein. The techniques described in the example system 400 may be performed by computing systems and/or components such as one or more components of the vehicle computing device(s) 504 and/or the computing device(s) 538.

An enhanced scenario determination system 402 may be configured to determine scenarios based on scenario requests and iteratively improve the similarity of such scenarios to the content of a scenario request. The enhanced scenario determination system 402 may receive a scenario request 404 that may describe or represent a type of requested scenario. For example, the scenario request 404 may be a natural language description of a scenario and/or scenario properties, characteristics, attributes, etc. Alternately or additionally, the scenario request 404 may be one or more scenarios and/or one or more scenario representations representing a scenario for which similar scenarios are requested.

The scenario request 404 may be processed by a scenario embeddings determination component 406 that may be configured at the enhanced scenario determination system 402. The scenario embeddings determination component 406 may be configured to generate one or more scenario representations based on the scenario request 404. These scenario representations may be embeddings, encodings, feature vectors, and/or any other type of data representation of scenario aspects, properties, characteristics, attributes, etc. In examples, the scenario embeddings determination component 406 may access and use past scenario requests and associated data stored at a previous request data store 408 to process current scenario requests and/or improve its determination of scenario representation.

In examples, the scenario embeddings determination component 406 may include a language-based embeddings component 407 that may be, for instance, an LLM. The language-based embeddings component 407 may process a natural language description of a scenario (e.g., scenario request 404) to generate language-based embeddings as output. These output language-based embeddings may be provided to an image-based embeddings component 409 that may be configured to generate image-based embeddings as output, for instance, using contrastive language alignment techniques. These image-based scenario embeddings may be output as scenario embeddings 410.

The scenario embeddings 410 of the embeddings determination component 406 may be provided to a scenario determination component 412 that may be configured to acquire and/or generate scenarios based on the scenario embeddings 410. In examples, the scenario determination component 412 may be configured with a scenario similarity determination component 414 that may be configured to determine similar scenario representation parameters based on the scenario embeddings 410. For example, the scenario similarity determination component 414 may determine a distance (e.g., Euclidian distance, weighted Euclidian distance) between the scenario embeddings 410 and individual scenario embeddings represented in scenario data 405 that may be associated with, or used to generate, scenarios. In determining these distances, the scenario similarity determination component 414 may use various weightings as described herein. The scenario similarity determination component 414 may then determine a subset of the scenarios represented in the scenario data 405 that may be associated with embeddings that have a relatively lowest distance from the scenario embeddings 410. These determined similar scenarios may be output as similar scenarios 422 for use as described below.

Alternatively or additionally, the enhanced scenario determination system 402 may be configured to generate similar scenarios based on a scenario request. In such examples, the scenario generation component 420 may generate one or more scenarios and/or scenario data based on the scenario embeddings 410 and/or based on instructions from the scenario similarity determination component 414. This may include generating embeddings, encodings, feature vectors, etc. that may be associated with the similar scenarios. For example, the scenario generation component 420 may generate a set of embeddings that are different, but relatively low distance, from the scenario embeddings 410. The scenario generation component 420 may further generate scenarios based on these determined embeddings. These determined similar scenarios may be output as similar scenarios 422 for use as described below The similar scenarios 422 may be provided to a scenario similarity feedback data determination system 424 that may be configured to determine similarity feedback data and/or representation quality data as described herein. For example, the scenario similarity feedback data determination system 424 may present scenarios to a user using an interface and collect user input indicating scenario and/or scenario element similarity and/or relevance feedback. The scenario similarity feedback data determination system 424 may also, or instead, include one or more components configured to (e.g., automatically) generate feedback data, such as one or more machine-learned models trained to determine, as output, similarity feedback data using scenarios and/or scenario request data as input.

The feedback data determined by the scenario similarity feedback data determination system 424 may be provided as scenario similarity feedback data 426 to an adjustment determination component 428 that may be configured to perform adjustments to weightings, scenario requests input, and/or similarity determination operations based on such feedback data.

In examples, the adjustment determination component 428 may include a weighting adjustment component 430 that may be configured to adjust weightings applied to scenario representations (e.g., embeddings, encodings, feature vectors, etc.) and/or related data in determining distances between such representations. For example, based on data in the scenario similarity feedback data 426 that indicates the similar scenarios 422 that were more or less relevant, the system may increase or decrease weightings applied to the scenario representations (e.g., embeddings, encodings, feature vectors, etc.) and/or portions thereof to determine distances between such scenario representations and a scenario representation associated with a scenario request, such as the scenario request 404. Other manipulations of distance determination data and/or operations that process such data may also, or instead, be implemented based on the scenario similarity feedback data 426. These weighting adjustments and/or other adjustments may be provided to the scenario similarity determination component 414 for use in similar scenario operations.

Alternatively, or additionally, the adjustment determination component 428 may include scenario request adjustment component 432 that may be configured to adjust scenario request input, for example, before providing such input to the language-based embeddings component 407 to generate language-based embeddings for further processing by the image-based embeddings component 409. For example, the scenario request adjustment component 432 may determine modified or substitute words or phrases for scenario requests that may result in improved language-based embeddings, and therefore improved similar scenario determinations. These scenario request adjustments may be provided to the scenario embeddings determination component 406 for use in scenario embeddings determination operations.

As described above, the enhanced scenario determination system 402 may iteratively perform the described similar scenario determination processes while acquiring feedback data (e.g., via that scenario similarity feedback data determination system 424) that it may use to improve such processes.

If the scenario similarity feedback data 426 indicates that there are no adjustments needed to any of the components and/or data processed by the enhanced scenario determination system 402 to determine similar scenarios and/or if the enhanced scenario determination system 402 is otherwise configured to do so, the enhanced scenario determination system 402 may provide the similar scenarios 422 to one or more other systems or components for use in testing, training, and/or other operations.

For example, the enhanced scenario determination system 402 may provide the similar scenarios 422 to a vehicle control component testing system 434 that may use the similar scenarios 422 to test a vehicle control component. For example, vehicle control component testing system 434 may include a simulator that may use the similar scenarios 422 to simulate an environment in which a (e.g., simulated) vehicle control component may be executed. When ready for production use (e.g., upon successful completion of testing), the vehicle control component testing system 434 may provide a tested vehicle control component 436 to a vehicle computing system 438 for use in controlling a vehicle.

The vehicle computing system 438 may include various components configured to perform one or more of the operations described herein. The vehicle computing system 438 may be configured with one or more sensor systems 444 that may control sensors and receive, process and/or may generate sensor data based on sensor emissions and/or detections. The vehicle computing system 438 may also be configured with a perception component 450 that may receive sensor data from the sensor system(s) 444 and perform detection and/or labeling operations using such sensor data. The vehicle computing system 438 may also include a prediction component 448 that may be configured to predict trajectories and other data associated with objects in an environment (e.g., that may be detected by the perception component 450 based on data from the sensor system(s) 444). The vehicle computing system 438 may also include a planning component 446 that may be configured to determine trajectories and/or routes for a vehicle at which the vehicle computing system 438 may be configured. The planning component 446 may interact with a mapping component 442 that may provide map data that may be used to perform trajectory and route determination operations.

The vehicle computing system 438 may include a vehicle control component 440 that may be, or include, the tested vehicle control component 436. The vehicle control component 440 may be configured to control one or more components of the vehicle at which the vehicle computing system 438 may be configured in order to navigate the vehicle through an environment. Such components may include steering components, propulsion components, braking components, safety components, emitters, communication components, and/or any other systems or components of the vehicle.

FIG. 5 depicts a block diagram of an example system 500 for implementing the techniques described herein. In at least one example, the system 500 can include a vehicle 502. The vehicle 502 can include a vehicle computing device 504 that may function as and/or perform the functions of a vehicle controller for the vehicle 502. The vehicle 502 can also include one or more sensor systems 506, one or more emitters 508, one or more communication connections 510, at least one direct connection 512, and one or more drive systems 514.

The vehicle computing device 504 can include one or more processors 516 and memory 518 communicatively coupled with the one or more processors 516. In the illustrated example, the vehicle 502 is an autonomous vehicle; however, the vehicle 502 could be any other type of vehicle. In the illustrated example, the memory 518 of the vehicle computing device 504 stores a localization component 520, a perception component 522, a vehicle control component 524, a planning component 528, one or more system controllers 530, one or more maps 532, and a prediction component 534. In various examples, the vehicle control component 524 and the system controller(s) 530 may be a same or integrated component, while in other examples, these components may perform at least some distinct functions and may be physically and/or logically separated components. Though depicted in FIG. 5 as residing in memory 518 for illustrative purposes, it is contemplated that any one or more of the localization component 520, the perception component 522, the vehicle control component 524, the planning component 528, the one or more system controllers 530, the one or more maps 532, and the prediction component 534 can additionally or alternatively be accessible to the vehicle 502 (e.g., stored remotely).

In at least one example, the localization component 520 can include functionality to receive data from the sensor system(s) 506 to determine a position and/or orientation of the vehicle 502 (e.g., one or more of an x-, y-, z-position, roll, pitch, or yaw). For example, the localization component 520 can include and/or request/receive a map of an environment and can continuously determine a location and/or orientation of the autonomous vehicle within the map. In some instances, the localization component 520 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 520 can provide data to various components of the vehicle 502 to determine an initial position of an autonomous vehicle for generating a trajectory and/or for generating map data.

In some instances, the perception component 522 can include functionality to perform object detection, segmentation, and/or classification, in addition to, or instead of, object auto-labeling and machine-learned model training operations. For example, the perception component 522 may provide information to the vehicle control component 524 that may be configured to perform vehicle control operations as described herein. In some examples, the perception component 522 can provide processed sensor data that indicates a presence of an entity that is proximate to the vehicle 502 and/or a classification of the entity as an entity type (e.g., car, pedestrian, cyclist, animal, building, tree, road surface, curb, sidewalk, traffic signal, traffic light, car light, brake light, solid object, impeding object, non-impeding object, unknown). In additional or alternative examples, the perception component 522 can provide processed sensor data that indicates one or more characteristics associated with a detected entity (e.g., a tracked object) and/or the environment in which the entity is positioned. The perception component 522 may use multichannel data structures to represent processed sensor data. In some examples, characteristics associated with an entity or object can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), a non-impeding or impeding object designation, intensity, etc. Such entity characteristics may be represented in a data structure (e.g., a voxel data structure generated as output of one or more voxelization operations, a two-dimensional grid of cells containing data, etc.). Characteristics associated with the environment can include, but are not limited to, a presence of another entity in the environment, a state of another entity in the environment, a time of day, a day of a week, a season, a weather condition, an indication of darkness/light, etc.

In general, the planning component 528 can determine a path for the vehicle 502 to follow to traverse through an environment. In some examples, the planning component 528 can determine various routes and trajectories and various levels of detail. For example, the planning component 528 can determine a route (e.g., planned route) to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 528 can generate an instruction for guiding the autonomous vehicle along at least a portion of the route from the first location to the second location. In at least one example, the planning component 528 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 502 to navigate.

In at least one example, the vehicle computing device 504 can include one or more system controllers 530, which can be configured to control steering, propulsion, braking, safety, emitters, communication, and other systems of the vehicle 502. These system controller(s) 530 can communicate with and/or control corresponding systems of the drive system(s) 514 and/or other components of the vehicle 502. The vehicle control component 524 may be similarly configured and/or may be configured to perform other vehicle control operations as described herein.

The memory 518 can further include one or more maps 532 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), non-visible light information (near-infrared light information, infrared light information, and the like), intensity information (e.g., lidar information, radar information, near-infrared light intensity information, infrared light intensity information, and the like); spatial information (e.g., image data projected onto a mesh, individual "surfels" (e.g., polygons associated with individual color and/or intensity)); and reflectivity information (e.g., specularity information, retroreflectivity information, BRDF information, BSSRDF information, and the like). In an example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 532 can include at least one map (e.g., images and/or a mesh). In some examples, the vehicle 502 can be controlled based at least in part on the maps 532. That is, the maps 532 can be used in connection with the localization component 520, the perception component 522, the vehicle control component 524, and/or the planning component 528 to determine a location of the vehicle 502, identify objects in an environment, and/or generate routes and/or trajectories to navigate within an environment.

In some examples, the one or more maps 532 can be stored on a remote computing device(s) (such as the computing device(s) 538) accessible via network(s) 536. In some examples, multiple maps 532 can be stored based on, for example, a characteristic (e.g., type of entity, time of day, day of week, season of the year). Storing multiple maps 532 can have similar memory requirements but increase the speed at which data in a map can be accessed.

In general, the prediction component 534 can generate predicted trajectories of objects in an environment. For example, the prediction component 534 can generate one or more predicted trajectories for vehicles, pedestrians, animals, and the like within a threshold distance from the vehicle 502. In some instances, the prediction component 534 can measure a trace of an object and generate a trajectory for the object based on observed and predicted behavior. In some examples, the prediction component 534 can use data and/or data structures based on return pulses to generate one or more predicted trajectories for various mobile objects in an environment. In some examples, the prediction component 534 may be a sub-component of perception component 522 and/or may interact with, or otherwise process data generated by, the vehicle control component 524.

In some instances, aspects of some or all of the components discussed herein can include any models, algorithms, and/or machine learning algorithms. For example, in some instances, the components in the memory 518 (and the memory 542, discussed below) can be implemented as a neural network. For instance, the memory 518 may include a deep tracking network that may be configured with a convolutional neural network (CNN) that may include one or more convolution/deconvolution layers.

An example neural network is an algorithm that passes input data through a series of connected layers to produce an output. Individual layers in a neural network can also comprise another neural network or can comprise any number of layers, and such individual layers may be convolutional, deconvolutional, and/or another type of layer. As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure, for example, to determine a learned upsampling transformation. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, EfficientNet, Xception, Inception, ConvNeXt, and the like. Additionally or alternatively, the machine-learned model discussed herein may include a vision transformer (ViTs).

In at least one example, the sensor system(s) 506 can include radar sensors, ultrasonic transducers, sonar sensors, location sensors (e.g., GPS, compass), inertial sensors (e.g., inertial measurement units (IMUs), accelerometers, magnetometers, gyroscopes), cameras (e.g., RGB, IR, intensity, depth), time of flight sensors, microphones, wheel encoders, environment sensors (e.g., temperature sensors, humidity sensors, light sensors, pressure sensors), etc. The sensor system(s) 506 can include multiple instances of one or more of these or other types of sensors. For instance, the camera sensors can include multiple cameras disposed at various locations about the exterior and/or interior of the vehicle 502. The sensor system(s) 506 can provide input to the vehicle computing device 504. Alternatively or additionally, the sensor system(s) 506 can send sensor data, via the one or more networks 536, to the one or more computing device(s) 538 at a particular frequency, after a lapse of a predetermined period of time, in near real-time, etc.

In some examples, the sensor system(s) 506 can include one or more lidar systems, such as one or more monostatic lidar systems, bistatic lidar systems, rotational lidar systems, solid state lidar systems, and/or flash lidar systems. In some examples, the sensor system(s) 506 may also, or instead, include functionality to analyze pulses and pulse data to determine intensity, drivable road presence, and/or other data.

The vehicle 502 can also include one or more emitters 508 for emitting light (visible and/or non-visible) and/or sound. The emitter(s) 508 in an example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners), and the like. The emitter(s) 508 in this example may also include exterior emitters. By way of example and not limitation, the exterior emitters in this example include lights to signal a direction of travel or other indicator of vehicle action (e.g., indicator lights, signs, light arrays), and one or more audio emitters (e.g., speakers, speaker arrays, horns) to audibly communicate with pedestrians or other nearby vehicles, one or more of which comprising acoustic beam steering technology. The exterior emitters in this example may also, or instead, include non-visible light emitters such as infrared emitters, near-infrared emitters, and/or lidar emitters.

The vehicle 502 can also include one or more communication connection(s) 510 that enable communication between the vehicle 502 and one or more other local and/or remote computing device(s). For instance, the communication connection(s) 510 can facilitate communication with other local computing device(s) on the vehicle 502 and/or the drive system(s) 514. Also, the communication connection(s) 510 can allow the vehicle to communicate with other nearby computing device(s) (e.g., other nearby vehicles, traffic signals). The communications connection(s) 510 also enable the vehicle 502 to communicate with a remote teleoperations computing device or other remote services.

The communications connection(s) 510 can include physical and/or logical interfaces for connecting the vehicle computing device 504 to another computing device or a network, such as network(s) 536. For example, the communications connection(s) 510 can enable Wi-Fi-based communication such as via frequencies defined by the IEEE 802.11 standards, short-range wireless frequencies such as Bluetooth, cellular communication (e.g., 2G, 3G, 4G, 4G LTE, 5G) or any suitable wired or wireless communications protocol that enables the respective computing device to interface with the other computing device(s).

In at least one example, the vehicle 502 can include one or more drive systems 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear). In at least one example, the drive system(s) 514 can include one or more sensor systems to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port). Additionally, the drive system(s) 514 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 514. Furthermore, the drive system(s) 514 may also include one or more communication connection(s) that enable communication by the respective drive system with one or more other local or remote computing device(s).

In at least one example, the direct connection 512 can provide a physical interface to couple the one or more drive system(s) 514 with the body of the vehicle 502. For example, the direct connection 512 can allow the transfer of energy, fluids, air, data, etc. between the drive system(s) 514 and the vehicle 502. In some instances, the direct connection 512 can further releasably secure the drive system(s) 514 to the body of the vehicle 502.

In some examples, the vehicle 502 can send sensor data to one or more computing device(s) 538 via the network(s) 536. In some examples, the vehicle 502 can send raw sensor data to the computing device(s) 538. In other examples, the vehicle 502 can send processed sensor data and/or representations of sensor data (e.g., data representing return pulses) to the computing device(s) 538. In some examples, the vehicle 502 may send sensor data to the computing device(s) 538 at a particular frequency, after a lapse of a predetermined period of time, in near real-time, etc. In some cases, the vehicle 502 may send sensor data (raw or processed) to the computing device(s) 538 as one or more log files.

The computing device(s) 538 can include processor(s) 540 and a memory 542 storing a planning component 550, a perception component 544, a vehicle control component 552, a vehicle control component testing/training system 554, and/or an enhanced scenario determination system 556 that may be configured to perform one or more of the operations described herein. In some instances, the perception component 544 can substantially correspond to the perception component 522 and can include substantially similar functionality. In some instances, the vehicle control component 552 can substantially correspond to the vehicle control component 524 and can include substantially similar functionality. In some instances, the planning component 550 can substantially correspond to the planning component 528 and can include substantially similar functionality. In some instances, the vehicle control component testing/training system 554 may perform one or more training and/or testing operations using the scenarios determined according to the disclosed examples. In further instances, the enhanced scenario determination system 556 may perform one or more scenario determination operations to determine scenarios and improve scenario determination according to the disclosed examples.

The processor(s) 516 of the vehicle 502 and the processor(s) 540 of the computing device(s) 538 can be any suitable one or more processors capable of executing instructions to process data and perform operations as described herein. By way of example and not limitation, the processor(s) 516 and 540 can comprise one or more Central Processing Units (CPUs), Graphics Processing Units (GPUs), and/or any other device or portion of a device that processes electronic data to transform that electronic data into other electronic data that can be stored in registers and/or memory. In some examples, integrated circuits (e.g., ASICs), gate arrays (e.g., FPGAs), and other hardware devices can also be considered processors in so far as they are configured to implement encoded instructions.

Memory 518 and 542 are examples of non-transitory computer-readable media. The memory 518 and 542 can store an operating system and one or more software applications, instructions, programs, and/or data to implement the techniques and operations described herein and the functions attributed to the various disclosed systems. In various implementations, the memory 518 and 542 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 5 is illustrated as a distributed system, in alternative examples, components of the vehicle 502 can be associated with the computing device(s) 538 and/or components of the computing device(s) 538 can be associated with the vehicle 502. That is, the vehicle 502 can perform one or more of the functions associated with the computing device(s) 538, and vice versa.

EXAMPLE CLAUSES

The following paragraphs describe various examples. Any of the examples in this section may be used with any other of the examples in this section and/or any of the other examples or embodiments described herein.

A: A system comprising one or more processors; and one or more non-transitory computer-readable media storing instructions executable by the one or more processors, wherein the instructions, when executed, cause the system to perform operations comprising receiving a scenario request requesting a type of scenario; determining, based at least in part on the scenario request, a scenario representation; determining, based at least in part on the scenario representation, a scenario; causing a display of the scenario; receiving scenario similarity feedback data indicative of whether the scenario is associated with the type of scenario in the scenario request; determining, based on the scenario similarity feedback data, a scenario representation criterion associated with a set of scenarios similar to the scenario; determining, based at least in part on the scenario representation criterion, the set of scenarios; determining, based at least in part on simulating a vehicle control component in the set of scenarios, a safety metric; and based at least in part on the safety metric satisfying a safety criterion, transmitting the vehicle control component to a vehicle.

B: The system of paragraph A, wherein the scenario request comprises a natural language description of the type of scenario; and determining the scenario representation comprises executing a large language model (LLM) using the natural language description of the type of scenario as input to generate the scenario representation as output.

C: The system of paragraph A or B, wherein the scenario similarity feedback data comprises one or more of an indication that the scenario is associated with the type of scenario; or an indication that the scenario is dissimilar to the type of scenario.

D: The system of any one of paragraphs A-C, wherein the scenario representation criterion comprises a distance metric.

E: The system of any one of paragraphs A-D, wherein the operations further comprise modifying the scenario representation criterion based at least in part on the scenario similarity feedback data.

F: One or more non-transitory computer-readable media storing instructions that, when executed by one or more processors, perform operations comprising receiving a scenario request; receiving scenario similarity feedback data; determining, based at least in part on the scenario similarity feedback data, a criterion associated with scenarios associated with the scenario request; determining, based at least in part on the criterion, the scenarios; and outputting the scenarios.

G: The one or more non-transitory computer-readable media of paragraph F, wherein the operations further comprise determining first scenarios based at least in part on the scenario request; and the scenario similarity feedback data is associated with the first scenarios.

H: The one or more non-transitory computer-readable media of paragraph F or G, wherein the operations further comprise determining a representation based at least in part on the scenario request; and determining the scenarios further based at least in part on the representation.

I: The one or more non-transitory computer-readable media of paragraph H, wherein the operations further comprise adjusting a weighting used to determine the scenarios based at least in part on the scenario similarity feedback data.

J: The one or more non-transitory computer-readable media of paragraph I, wherein adjusting the weighting comprises executing a machine-learned adjustment model using the scenario similarity feedback data as input to generate a weighting adjustment as output, and determining the scenarios comprises determining the scenarios based at least in part on the weighting adjustment.

K: The one or more non-transitory computer-readable media of any one of paragraphs F-J, wherein determining the scenarios comprises generating the scenarios based at least in part on the criterion.

L: The one or more non-transitory computer-readable media of any one of paragraphs F-K, wherein determining the scenarios comprises retrieving the scenarios from a scenario data store based at least in part on the criterion.

M: The one or more non-transitory computer-readable media of paragraph L, wherein the scenarios are based at least in part on data collected by one or more vehicles traversing an environment.

N: The one or more non-transitory computer-readable media of any one of paragraphs F-M, wherein outputting the scenarios comprises outputting the scenarios to a simulator configured to test a simulated vehicle control component to determine, based at least in part on the scenarios, one or more of a safety parameter or a performance parameter for a vehicle control component.

O: A method comprising receiving a request for a scenario; receiving feedback data associated with first scenarios associated with the scenario; determining, based at least in part on the feedback data, a criterion associated with second scenarios associated with the scenario; determining, based at least in part on the criterion, second scenarios; and outputting the second scenarios.

P: The method of paragraph O, further comprising soliciting second feedback data associated with the second scenarios; receiving the second feedback data; and determining, based at least in part on the second feedback data, to modify the criterion.

Q: The method of paragraph O or P, wherein receiving the request for the scenario comprises receiving a natural language description of the scenario; generating a language-based embedding based on the natural language description; generating an image-based embedding based on the language-based embedding; and determining the first scenarios based at least in part on the image-based embedding.

R: The method of paragraph Q, wherein determining the first scenarios comprises determining distances between the image-based embedding and individual embeddings associated with individual scenarios of second scenarios; and determining a subset of the second scenarios as the first scenarios based at least in part on the distances.

S: The method of paragraph Q, wherein generating the image-based embedding comprises using contrastive language alignment based at least on part on the language-based embedding to determine the image-based embedding.

T: The method of any one of paragraphs O-S, further comprising receiving second feedback data associated with the second scenarios; and providing the second scenarios to a vehicle control component testing system based at least in part on the second feedback data.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:

one or more processors; and one or more non-transitory computer-readable media storing instructions executable by the one or more processors, wherein the instructions, when executed, cause the system to perform operations comprising:

receiving a scenario request comprising a natural language description of a type of scenario;

generating a language-based embedding based at least in part on the natural language description;

generating an image-based embedding based at least in part on the language-based embedding;

determining, based at least in part on the image-based embedding, a scenario representation;

determining, based at least in part on the scenario representation, a scenario;

causing a display of the scenario;

receiving scenario similarity feedback data indicative of whether the scenario is associated with the type of scenario;

determining, based on the scenario similarity feedback data, a scenario representation criterion associated with a set of scenarios similar to the scenario;

determining, based at least in part on the scenario representation criterion, the set of scenarios;

determining, based at least in part on simulating a vehicle control component in the set of scenarios, a safety metric; and based at least in part on the safety metric satisfying a safety criterion, transmitting the vehicle control component to a vehicle.

2. The system of claim 1, wherein generating the language-based embedding comprises executing a large language model (LLM) using the natural language description as input to generate the language-based embedding as output.

3. The system of claim 1, wherein the scenario similarity feedback data comprises one or more of:

an indication that the scenario is associated with the type of scenario; or an indication that the scenario is dissimilar to the type of scenario.

4. The system of claim 1, wherein the scenario representation criterion comprises a distance metric.

5. The system of claim 1, wherein the operations further comprise modifying the scenario representation criterion based at least in part on the scenario similarity feedback data.

6. One or more non-transitory computer-readable media storing instructions that, when executed by one or more processors, perform operations comprising:

receiving a request for a scenario;

generating a language-based embedding based at least in part on a natural language description of the scenario;

generating an image-based embedding based at least in part on the language-based embedding;

determining first scenarios associated with the scenario based at least in part on the image-based embedding;

receiving scenario similarity feedback data for the first scenarios;

determining, based at least in part on the scenario similarity feedback data, a criterion associated with second scenarios associated with the scenario;

determining, based at least in part on the criterion, the second scenarios;

determining, based at least in part on simulating a vehicle control component in the second scenarios, a safety metric; and based at least in part on the safety metric satisfying a safety criterion, transmitting the vehicle control component to a vehicle.

7. The one or more non-transitory computer-readable media of claim 6, wherein the scenario similarity feedback data comprises one or more of:

an indication that the first scenarios are associated with a type of scenario, or an indication that the first scenarios are dissimilar to the type of scenario.

8. The one or more non-transitory computer-readable media of claim 6, wherein:

the operations further comprise determining a representation based at least in part on the request; and determining the second scenarios further based at least in part on the representation.

9. The one or more non-transitory computer-readable media of claim 8, wherein the operations further comprise adjusting a weighting used to determine the second scenarios based at least in part on the scenario similarity feedback data.

10. The one or more non-transitory computer-readable media of claim 9, wherein:

adjusting the weighting comprises executing a machine-learned adjustment model using the scenario similarity feedback data as input to generate a weighting adjustment as output, and determining the second scenarios comprises determining the second scenarios based at least in part on the weighting adjustment.

11. The one or more non-transitory computer-readable media of claim 6, wherein determining the second scenarios comprises generating the second scenarios based at least in part on the criterion.

12. The one or more non-transitory computer-readable media of claim 6, wherein determining the second scenarios comprises retrieving the second scenarios from a scenario data store based at least in part on the criterion.

13. The one or more non-transitory computer-readable media of claim 12, wherein the second scenarios are based at least in part on data collected by one or more vehicles traversing an environment.

14. The one or more non-transitory computer-readable media of claim 6, wherein determining the safety metric comprises outputting the second scenarios to a simulator configured to test a simulated vehicle control component to determine, based at least in part on the second scenarios, one or more of a safety parameter or a performance parameter for the vehicle control component.

15. A method comprising:

receiving a request for a scenario;

generating a language-based embedding based at least in part on a natural language description of the scenario;

generating an image-based embedding based at least in part on the language-based embedding;

determining first scenarios associated with the scenario based at least in part on the image-based embedding;

receiving feedback data associated with the first scenarios;

determining, based at least in part on the feedback data, a criterion associated with second scenarios associated with the scenario;

determining, based at least in part on the criterion, the second scenarios;

determining, based at least in part on simulating a vehicle control component in the second scenarios, a safety metric; and based at least in part on the safety metric satisfying a safety criterion, transmitting the vehicle control component to a vehicle.

16. The method of claim 15, further comprising:

soliciting second feedback data associated with the second scenarios;

receiving the second feedback data; and determining, based at least in part on the second feedback data, to modify the criterion.

17. The method of claim 15, wherein the safety metric comprises one or more of a safety parameter or a performance parameter for the vehicle control component.

18. The method of claim 15, wherein determining the first scenarios comprises:

determining distances between the image-based embedding and individual embeddings associated with individual scenarios of second scenarios; and determining a subset of the second scenarios as the first scenarios based at least in part on the distances.

19. The method of claim 15, wherein generating the image-based embedding comprises using contrastive language alignment based at least on part on the language-based embedding to determine the image-based embedding.

20. The method of claim 15, further comprising:

receiving second feedback data associated with the second scenarios; and providing the second scenarios to a vehicle control component testing system based at least in part on the second feedback data.

* * * * *